United States Patent
Kim et al.

(10) Patent No.: US 11,641,112 B2
(45) Date of Patent: May 2, 2023

(54) SYSTEMS AND METHODS FOR MANAGING ELECTRICITY SUPPLY FROM DEMAND

(71) Applicants: Junkyeong Kim, Rancho Cucamonga, CA (US); Minjun Seo, Rancho Cucamonga, CA (US)

(72) Inventors: Junkyeong Kim, Rancho Cucamonga, CA (US); Minjun Seo, Rancho Cucamonga, CA (US)

(73) Assignee: MicroNOC, Inc., Rancho Cucamonga, CA (US)

( * ) Notice: Subject to any disclaimer, the term of this patent is extended or adjusted under 35 U.S.C. 154(b) by 303 days.

(21) Appl. No.: 17/180,502

(22) Filed: Feb. 19, 2021

(65) Prior Publication Data
US 2021/0175714 A1  Jun. 10, 2021

Related U.S. Application Data

(63) Continuation-in-part of application No. 16/576,762, filed on Sep. 19, 2019, now Pat. No. 11,177,661.

(51) Int. Cl.
*G05B 19/042* (2006.01)
*H02J 3/32* (2006.01)
(Continued)

(52) U.S. Cl.
CPC .............. *H02J 3/32* (2013.01); *G05B 19/042* (2013.01); *H02J 3/144* (2020.01); *H02J 3/381* (2013.01); *H02J 13/00002* (2020.01); *H02J 13/00036* (2020.01); *G05B 2219/2639* (2013.01); *H02J 2300/24* (2020.01); *H02J 2310/12* (2020.01)

(58) Field of Classification Search
CPC .......... G05B 19/042; G05B 2219/2639; G06Q 50/06; Y02B 10/10; Y02B 70/3225; Y02B 90/20; Y02E 10/56; Y02P 90/50; Y04S 20/12; Y04S 20/222; H02J 13/00002; H02J 13/00036; H02J 2300/24; H02J 2310/12; H02J 3/144; H02J 3/32; H02J 3/381; H02J 7/35
See application file for complete search history.

(56) References Cited

U.S. PATENT DOCUMENTS

| | | | | |
|---|---|---|---|---|
| 2011/0313964 | A1* | 12/2011 | Sanchey Loureda ... | H02J 3/003 706/50 |
| 2014/0316600 | A1* | 10/2014 | Jammer .................. | H02J 3/322 700/297 |
| 2017/0358041 | A1* | 12/2017 | Forbes, Jr. .............. | B60L 53/64 |

OTHER PUBLICATIONS

Youssef et al. "A DDS-Based Energy Management Framework for Small Microgrid Operation and Control" from "IEEE Transactions On Industrial Informatics, vol. 14, No. 3, Mar. 2018" (Year: 2018).*

(Continued)

*Primary Examiner* — Yuhui R Pan
(74) *Attorney, Agent, or Firm* — Patent PG; Bao Tran

(57) ABSTRACT

A system to manage power consumption from a grid includes a building switchgear; an energy storage system (ESS) coupled to the building switchgear to selectively provide power in response to a customer power demand to prevent a customer grid power consumption from spiking and peaking at grid imbalance highest cost on peak times; an energy management system (EMS) to operate the ESS from behind-the-meter; and a data distribution service (DDS) coupled to the EMS forming a DDS-EMS network to provide a global data space servicing EMS edge publishers and subscribers.

18 Claims, 15 Drawing Sheets

(51) Int. Cl.
*H02J 13/00* (2006.01)
*H02J 3/38* (2006.01)
*H02J 3/14* (2006.01)

(56) References Cited

OTHER PUBLICATIONS

Hakiri et al. "Supporting End-to-end Scalability and Real-time Event Dissemination in the OMG Data Distribution Service over Wide Area Networks" from "Journal of Systems and Software, 2013, 86 (10), pp. 2574-2593. hal-01052934" (Year: 2013).*

* cited by examiner

FIG. 1

| |
|---|
| Profile Customer Electricity Usage and illustrate potential cost savings (2) |
| Optimize Resource Capacity of Equipment based on Profile and Design Equipment including Battery/Solar with the Capacity (4) |
| Provide separate meters for utility, Regional ISO, and for NOC control of equipment (6) |
| Manage Equipment to minimize cost for customer (8) |
| Provide Spare Power to Grid on Demand (10) |

FIG. 2D

Capacity AERS-QBR: 153.6 kW, 280320 kWh

| Project Year | DCM on Peak | ECM on Peak | Total Savings |
|---|---|---|---|
| Year 1 | $1943.71 | $3762.31 | $5672.02 |
| Year 2 | $13695.90 | $39404.72 | $53100.62 |
| Year 3 | $14380.69 | $41374.96 | $55755.65 |
| Year 4 | $15999.73 | $43343.71 | $58343.43 |
| Year 5 | $15854.71 | $45618.89 | $61473.61 |
| Year 6 | $16647.65 | $47896.69 | $64544.14 |
| Year 7 | $17479.82 | $50291.52 | $67771.34 |
| Year 8 | $18353.81 | $52806.10 | $71159.91 |
| Year 9 | $19271.50 | $55446.40 | $74717.91 |
| Year 10 | $20235.08 | $58218.72 | $78453.80 |
| Year 11 | $21246.83 | $61129.66 | $82376.49 |
| Year 12 | $22309.17 | $64186.14 | $86495.31 |
| Year 13 | $23424.63 | $67395.45 | $90820.08 |
| Year 14 | $24595.86 | $70765.22 | $95361.08 |
| Year 15 | $25825.66 | $74303.48 | $100129.14 |
| Year 16 | $27116.94 | $78018.66 | $105135.60 |
| Year 17 | $28472.79 | $81919.59 | $110392.38 |
| Year 18 | $29896.43 | $86015.57 | $115911.99 |
| Year 19 | $31391.25 | $90316.35 | $121707.59 |
| Year 20 | $32960.81 | $94832.16 | $127792.97 |
| Total | $431302.78 | $1240909.28 | $1672212.07 |

FIG. 2E

AERS-QBR Diagnosis Savings Report (09/03/2019)

miroNoc

| Utility Bill Savings Projection Analysis Parameters | |
|---|---|
| Demand Charge Management (DCM) | |
| Utility Demand Rate Max/On Peak | $21.23 |
| Utility Demand Rate Max/Facility | $19.10 |
| QBR Resource Capacity | 153.6kW |
| Months | 4 |
| Energy Charge Management (ECM) | |
| Utility Energy Rate Max/On Peak (Sum) | $0.16997 |
| Utility Energy Rate Part/Mid Peak (Win) | $0.11583 |
| QBR System Capacity | 768kWh |
| Hours | 1,825 |
| Total Bill Savings Projected (Year 1) | $62,307.66 |

AERS™ QBR UTILITY BILL SAVINGS PROJECTION

| Project Year | DCM (kW) | ECM (kWh) | TOTAL |
|---|---|---|---|
| 1 | $ 24,778.75 | $ 37,528.31 | $ 62,307.06 |
| 2 | $ 25,522.11 | $ 38,654.16 | $ 64,176.27 |
| 3 | $ 26,287.78 | $ 39,813.78 | $ 66,101.56 |
| 4 | $ 27,076.41 | $ 41,008.19 | $ 68,084.61 |
| 5 | $ 27,888.70 | $ 42,238.44 | $ 70,127.14 |
| 6 | $ 28,725.36 | $ 43,505.59 | $ 72,230.96 |
| 7 | $ 29,587.13 | $ 44,810.76 | $ 74,397.89 |
| 8 | $ 30,474.74 | $ 46,155.08 | $ 76,629.82 |
| 9 | $ 31,388.98 | $ 47,539.74 | $ 78,928.72 |
| 10 | $ 32,330.65 | $ 48,965.93 | $ 81,296.58 |
| 11 | $ 33,300.57 | $ 50,434.91 | $ 83,735.48 |
| 12 | $ 34,299.59 | $ 51,947.95 | $ 86,247.54 |
| 13 | $ 35,328.58 | $ 53,506.39 | $ 88,834.97 |
| 14 | $ 36,388.43 | $ 55,111.58 | $ 91,500.02 |
| 15 | $ 37,480.09 | $ 56,764.93 | $ 94,245.02 |
| 16 | $ 38,604.49 | $ 58,467.88 | $ 97,072.37 |
| 17 | $ 39,762.62 | $ 60,221.92 | $ 99,984.54 |
| 18 | $ 40,955.50 | $ 62,028.57 | $ 102,984.08 |
| 19 | $ 42,184.17 | $ 63,889.43 | $ 106,073.60 |
| 20 | $ 43,449.69 | $ 65,806.11 | $ 109,255.81 |
| TOTAL | $ 665,814.35 | $ 1,008,399.67 | $ 1,674,214.01 |

*Utility Bill Savings Projection Notes*

- Second year and onwards annual 3% inflation rate added
- ECM is calculated using annual average rate
- Utility Bill Saving means during the highest rate hours, energy usage is reduced by AERS QBR resource capacity; power and/or energy consumption management switches from utility to QBR system installed on site; therefore, the reduced AERS QBR resource capacity will no longer be counted and charged on utility bill

| To Activate Your Utility Bill Savings | Registration Fee (per panel) | $5,000.00 |
|---|---|---|
| | Security Deposit ($100/kW) | $15,360.00 |

| AERS QBR Management Services Provided Upon Registration | | |
|---|---|---|
| Design, Procure, Interconnect QBR System for site | No Cost to Your Business | (Cost: $337,920.00) |
| Install, Own, Operate, Maintain, QBR System on site | No Cost to Your Business | |
| AERS QBR Rate Balancing Management (Bill Savings Service) | 25%* Off Utility Highest Cost Rate; Billed Monthly** | |
| Minimum Service Years Provided*** | 5 Years from the start of system operation | |

*Refer to Pricing Index at time of Execution of Registration
**A monthly performance statement of bill savings operation services is provided
***A minimum of 5 years binding service is required

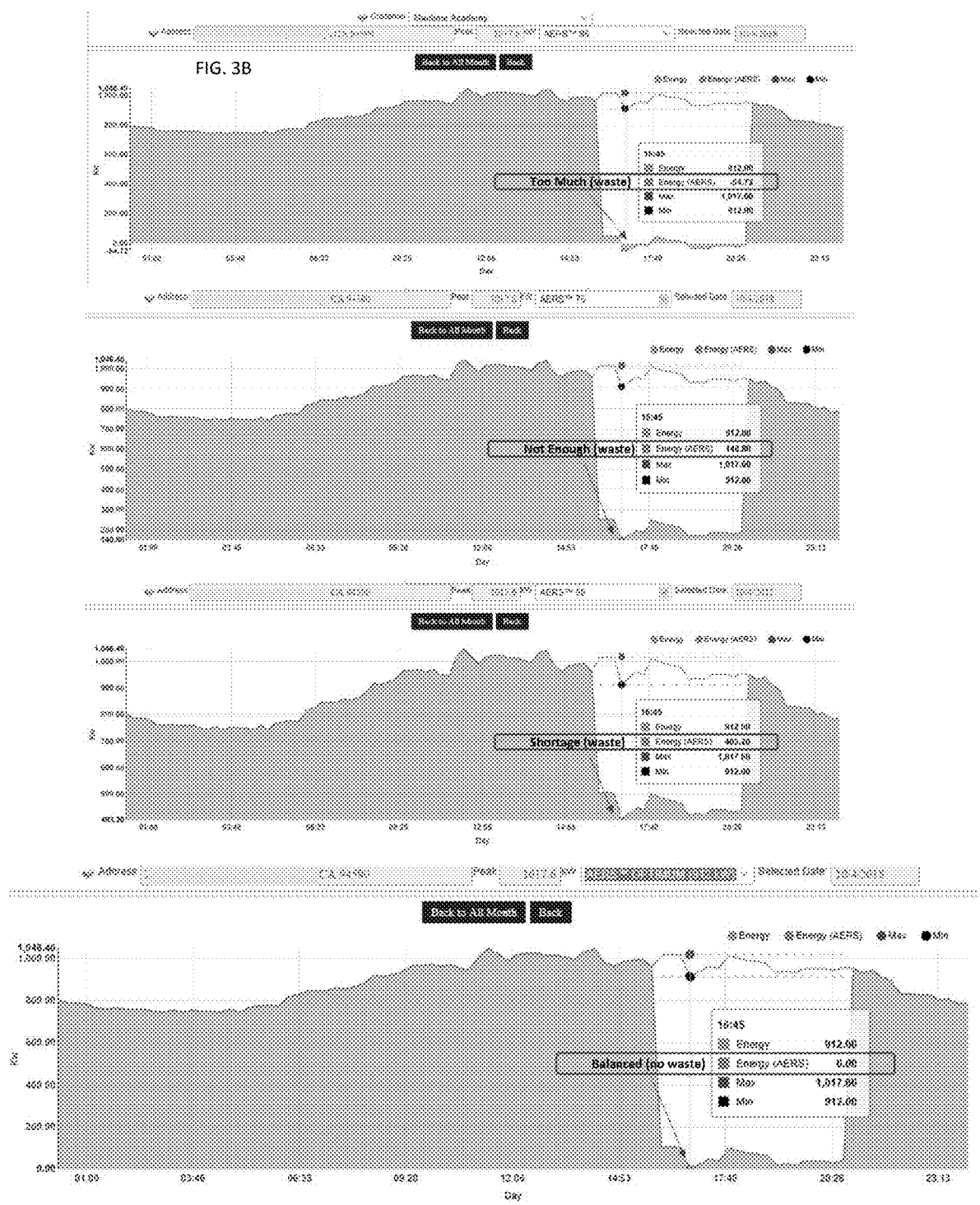

Savings Projection Comparison

| Traditional Energy Market (Solar) | |
|---|---|
| Year | Annual kWh$ |
| 1 | $159,687.50 |
| 2 | $167,671.88 |
| 3 | $176,055.47 |
| 4 | $184,858.24 |
| 5 | $194,101.15 |
| 6 | $203,806.21 |
| 7 | $213,996.52 |
| 8 | $224,696.35 |
| 9 | $235,931.17 |
| 10 | $247,727.72 |
| 11 | $260,114.11 |
| 12 | $273,119.82 |
| 13 | $286,775.81 |
| 14 | $301,114.60 |
| 15 | $316,170.33 |
| 16 | $331,978.84 |
| 17 | $348,577.79 |
| 18 | $366,006.68 |
| 19 | $384,307.01 |
| 20 | $403,522.36 |
|  | $5,280,219.55 |

| Balance Market (QBR) | | | | |
|---|---|---|---|---|
| Year | QBR kWh$ (EM) | QBR kWh$ (DM) | ISO kWh$ | Total |
| 1 | $119,700.00 | $292,000.00 | $164,250.00 | $575,950.00 |
| 2 | $125,685.00 | $306,600.00 | $172,462.50 | $604,747.50 |
| 3 | $131,969.25 | $321,930.00 | $181,085.63 | $634,984.88 |
| 4 | $138,567.71 | $338,026.50 | $190,139.91 | $666,734.12 |
| 5 | $145,496.10 | $354,927.83 | $199,646.90 | $700,070.82 |
| 6 | $152,770.90 | $372,674.22 | $209,629.25 | $735,074.37 |
| 7 | $160,409.45 | $391,307.93 | $220,110.71 | $771,828.08 |
| 8 | $168,429.92 | $410,873.32 | $231,116.24 | $810,419.49 |
| 9 | $176,851.42 | $431,416.99 | $242,672.06 | $850,940.46 |
| 10 | $185,693.99 | $452,987.84 | $254,805.66 | $893,487.49 |
| 11 | $194,978.69 | $475,637.23 | $267,545.94 | $938,161.86 |
| 12 | $204,727.62 | $499,419.09 | $280,923.24 | $985,069.95 |
| 13 | $214,964.00 | $524,390.05 | $294,969.40 | $1,034,323.45 |
| 14 | $225,712.20 | $550,609.55 | $309,717.87 | $1,086,039.62 |
| 15 | $236,997.81 | $578,140.03 | $325,203.77 | $1,140,341.60 |
| 16 | $248,847.70 | $607,047.03 | $341,463.95 | $1,197,358.68 |
| 17 | $261,290.09 | $637,399.38 | $358,537.15 | $1,257,226.62 |
| 18 | $274,354.59 | $669,269.35 | $376,464.01 | $1,320,087.95 |
| 19 | $288,072.32 | $702,732.82 | $395,287.21 | $1,386,092.35 |
| 20 | $302,475.94 | $737,869.46 | $415,051.57 | $1,455,396.97 |
|  | $3,957,994.71 | $9,655,258.60 | $5,431,082.96 | $19,044,336.27 |

Assumption:
*Traditional Solar capacity: 1MW
*Daily solar hours avg /NREL: 6.25 hours
*Solar PPA: 0.07¢ (CNI), 0.03¢ (In front of the meter)
*CAPEX ($800/kWdc after ITC incentives)
*Permit Lead Time: 1 year Assumption:
*QBR capacity: 1MW
*QBR model using a 5 hour battery
*On Peak kWh$ (EM): 0.16¢   On Peak kW$ (DM): $19.95
*CAISO wholesale: 0.09¢
*EM (Energy Management)  DM (Demand Management)
*CAPEX ($1450/kWdc after ITC incentives)
*Permit Lead Time: 12 weeks

FIG. 3C

SYSTEMS AND METHODS FOR MANAGING ELECTRICITY SUPPLY FROM DEMAND

This is a continuation in part application of Ser. No. 16/576,762 filed 19 Sep. 2019, the content of which is incorporated by reference.

BACKGROUND

The present invention relates to managing electric power costs, particular those in a time of use (TOU) environment with Qualified Balance Resources (QBR).

Lowering utility bill and Using clean energy are two major goals for energy market. In spite of great efforts of lowering cost of energy, often referred to Levelized Cost of Energy or LCOE), for solar photovoltaic and other renewable energy resources, utility bill has kept increasing to the rate payers. One of the major causes of increasing energy rates is due to imbalance of grid in terms of Time-of Use. For example, in California Grid, prices of energy have dramatically increased during the evening hours with the high demand over past years, known as "Duck Curve." Unfortunately, thermal generators, known as "gas peakers," are largely used to mitigate this high demand of the evening hours due to their dispatchability. As a result, rate payers have to use unclean energy and pay higher utility rates from the grid.

In recent, energy policy makers have driven energy storage resources, mainly consisting of battery energy storage system, to participate in grid balancing as an alternative solution to lowering the dependency of thermal generators. FERC Order 841 and FERC Order 2222 allows energy storage resources to participate in grid wholesale's trading market including aggregation from Behind-the-Retail Meter resources. Facing high costs in new power plants, advancements in energy technologies, battery storage and consumer cost-cutting programs such as net-metering incentives, many local utilities need to adjust their business models so they continue to be profitable and relevant in the country's energy system.

One adaptation that utilities nationally have begun to implement is time-of-use (TOU) pricing, which includes demand charges for most business power consumers. Local utilities in California, Arizona, Massachusetts and other states have adopted TOU pricing as a means not only to combat falling revenue but also to ensure that they have the necessary finances to keep the energy grid running.

Time-of-use is a rate plan in which rates vary according to the time of day, season, and day type (weekday or weekend/holiday). Higher rates are charged during the peak demand hours and lower rates during off-peak (low) demand hours. Rates are also typically higher in summer months than in winter months. This rate structure provides price signals to energy users to shift energy use from peak hours to off-peak hours. Time-of-use rate plans better align the price of energy with the cost of energy at the time it is produced. Lower rates in the winter and during partial-peak and off-peak hours offer an incentive for customers to shift energy use away from more expensive summer and peak hours, which can help consumers save money and reduce strain on the electric grid.

Currently, all commercial, industrial and agricultural customers in California are required to be on a time-of-use plan. If customers have energy usage that can be shifted from peak hours to off-peak hours, they may be able to reduce their energy bill by switching to a time-of-use rate plan. Some time-of-use rate plans include a monthly Demand Charge. This Demand Charge is calculated by using the 15-minute interval during each billing month when a business uses its maximum amount of electricity. As a benefit to this type of rate plan, regular electricity usage charges are about 30% lower than for a comparable rate plan without a Demand Charge, and the Demand Charge depends on a customer's peak monthly demand patterns.

One way to lower monthly Demand Charge is to stagger the times of equipment operation, rather than using all equipment at the same time, minimizing spikes in your electricity use. spread your electricity use throughout the day to lower the Demand Charge. However, businesses frequently cannot keep constantly monitoring their equipment power usage, and as a result, many businesses face high electricity bills.

The grid operation and balancing of electricity pricing to keep the electric grid energized is heavily relied on the available baseload and peak power generations suppling through grid intertie locations every hour of the day to serve load. This method ensures the reliability and safety for electricity consumption; however, requires electricity demand of customer's usage behavior to be in similar patterns throughout the grid every 5 minute, 15 minute, and hourly times throughout a 24 hour period and the extra setup of supply reserves for when load demand usage patterns change. With aging grid lines and baseload generations requiring more costly supply reserves bundled with uncontrollable renewable power generation interconnecting into the grid, patterns are changing thus causing more issues triggering high cost of electricity.

SUMMARY

In a first aspect, a system to manage power consumption from a grid includes a building switchgear; an independent system operator (ISO) meter coupled to the building switchgear, the ISO meter including a telemetry unit to communicate with an ISO; and an energy storage system (ESS) coupled to the building switchgear, wherein the ESS selectively provides power in response to a customer power demand to prevent a customer grid power consumption from spiking and peaking at grid imbalance highest cost on peak times.

In a second aspect, a system to manage power consumption from a grid includes a utility meter coupled to the grid and site switchgear providing historical interval data; a site meter behind the utility meter (BTM) coupled to the switchgear; an independent system operator (ISO) meter coupled to the BTM switchgear; a telemetry unit to communicate with an ISO; and an energy storage system (ESS) coupled to the telemetry unit, switchgear, and ISO allowable resource performance meter, wherein the ESS selectively provides power in response to a customer power demand to prevent a customer grid power consumption to spike at the time when cost is more expensive ("congested hours") on the main grid to provide the high usage without disruption to grid power management and customer's business operation.

In a third aspect, a method to manage power consumption from a grid includes profiling customer electricity usage and illustrating potential cost savings; optimizing a resource capacity of equipment based on the profile, wherein the equipment includes ESS or ESS coupled with alternative generation such as Solar, separate meters for utility, Regional ISO, resource performance, and for NOC control of equipment; and manage the equipment to minimize cost for customer.

In a fourth aspect, a site switchgear includes a first connection for a utility meter providing historical interval data; a second connection for a site meter behind the utility meter (BTM), a third connection for an independent system organization (ISO) meter, and a fourth connection for an energy storage system (ESS) that selectively provides power in response to a customer power demand to prevent a customer grid power consumption to spike at the time when cost is more expensive on the main grid to provide the high usage without disruption to grid power management and customer's business operation.

In a fifth aspect, a system to manage power consumption from a grid includes a utility meter coupled to the grid and site switchgear providing historical interval data; a site meter behind the utility meter (BTM) coupled to the grid switchgear; an independent system operator (ISO) meter coupled to the BTM grid switchgear; a telemetry unit to communicate with an ISO; and an energy storage system (ESS) coupled to the telemetry unit, switchgear, and ISO allowable resource performance meter, wherein the ESS selectively provides power in response to a customer power demand to prevent a customer grid power consumption to spike at the time when cost is more expensive on the main grid to provide the high usage without disruption to grid power management and customer's business operation.

In a sixth aspect, each building site that is equipped with QBR becomes a grid addition serving the balance of supply and demand from consumption usage needs that synchronizes with the grid TOU.

In a seventh aspect, a system to manage power consumption from a grid includes a building switchgear; an energy storage system (ESS) coupled to the building switchgear to selectively provide power in response to a customer power demand to prevent a customer grid power consumption from spiking and peaking at grid imbalance highest cost on peak times; an energy management system (EMS) to operate the ESS from behind-the-meter; and a data distribution service (DDS) coupled to the EMS forming a DDS-EMS network to provide a global data space servicing EMS edge publishers and subscribers.

Advantages of the above aspects may include one or more of the following. The system mitigates the cost for both grid and customers is to reverse some of the grid balancing reliance from power energy supply side to demand load side. As each commercial, industrial, and agricultural customer's demand and energy usage are being balanced and managed using the power consumption management method stated above, the meter(s), resource equipment, and load data of customer's time of use of grid power versus the time of use of the optimized and controllable resource capacity are then networked in an aggregated energy pool with location identification like a map providing utilities and grid operators real-time information of reliable and available energy at specific times. This synchronization with grid operation method reduces the need to rely on excess and expensive power supply for grid operators while reducing fuel costs for power producers with more accuracy on load capacity needs.

Other advantages may include one or more of the following. Buildings equipped with QBR capable systems helps to defer/reduce the upgrade cost for utilities because the QBR system better matches demand with supply and reduces the extra capacity that the grid must hold in reserve for peak power consumption. As the system incorporates a high degree of control for all parties, grid operators can decrease/defer the cost of upgrading grid capacity. An aggregation of smart switchgears in buildings turn the buildings into smart powerplant, further reducing utility upgrade costs.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

As used herein defined, the term ISO meter (such as those for CAISO) are meters that conform to the following properties:

ISO meter should pass the NIST Traceable Laboratory testing when generation of Settlement Quality Meter Data (SQMD) direct with ISO ISO meter should have at least 2 channels, preferably 4 and is capable of measuring both load and generation when generation of SQMD is from ISO certified Scheduling Coordinator (SC)

Should have the minimum of the following technical specification standards:

ANSI C12 along with other UDC and LRA requirements at time of install

ANSI C12.1—American National Standard Code For Electricity Metering

ANSI C12.6—American National Standard For Marking And Arrangement Of Terminals For Phase-Shifting Devices Used In Metering ANSI C12.7—American National Standard For Watt-hour Meter Sockets ANSI C12.8—American National Standard For Test Blocks And Cabinets For installation Of Self-Contained A-Base Watt-hour Meters ANSI C12.9—American National Standard For Test Switches For Transformer-Rated Meters ANSI C12.10—American National Standard For Electromechanical Watt-hour Meters ANSI C12.11—American National Standard For Instrument Transformers For Revenue Metering, 10 kV BIL Through 350 kV BIL ANSI C12.16—American National Standard For Solid-State Electricity Meters ANSI C12.18—American National Standard For Protocol Specification For ANSI Type 2 Optical Port ANSI C12.20—American National Standard For Electricity Meters 0.2 and 0.5 Accuracy Class ANSI C57.13—IEEE Standard Requirements for Instrument Transformers Revenue quality with a 0.2 Accuracy Class Remotely accessibly, reliable, 60 Hz, three phase, bi-directional, programmable and multifunction, and certified for correction operation at the service voltage. If single phase connection then metering device requirements should meet utility distribution companies.

Capable of measuring kWh, kVARh, and providing calculated three phase values for kVAh, kVA Should have demand function including cumulative, rolling, block interval demand calculation and maximum demand peaks Should be battery backup for maintaining RAM and a real-time clock during outages of up to 60 days.

Should be capable of being powered either internally or externally from an AC source. It is recommended that all meters have an auxiliary source or emergency backup source of power to avoid loss of data.

Should be capable of providing data to the data collection system used by the Scheduling Coordinator.

Should be capable of providing interval data at granularity required based on market participation.

Should be capable of 60 days storage of kWh, KVARh, and/or 4 quadrant interval data Should be calibrated to provide the following accuracy:
0.2% at full load at power factor of 100%;
0.25% at full load at power factor of 50% lag;
0.25% at full load power factor at 50% lead; and
0.25% at light load at power factor of 100%.

BRIEF DESCRIPTION OF THE DRAWINGS

FIG. 1 shows an exemplary process for optimizing electricity cost for power consumers.

FIGS. 2D-2E illustrate an exemplary electricity costs analysis and recommendation for a customer.

FIGS. 3A-3B illustrate in more detail operation 2 of FIG. 1, while FIG. 3C illustrates an exemplary cost saving projection.

DESCRIPTION

FIG. 1 shows an exemplary process for optimizing electricity cost for power consumers. The process starts by profiling the customer Electricity Usage using historical 15 min interval data gathered from utility GB data sharing or utility interval data files, and such information is used to illustrate potential approaches for cost savings (2). The result is rendered as an online service as illustrated in the exemplary user interface of FIGS. 2A-2B, and a report can be generated as illustrated in FIG. 2C. Next, the process optimizes Resource Capacity of Equipment based on Profile and Design Equipment including ESS or ESS+ Alternative Generation with the Capacity (4).

The equipment is enhanced with separate meters, one for the load, one for the Regional ISO (such as the California Independent System Operator), and one for the network operations center (NOC) controller and for local control of equipment (6). The NOC manages the equipment to minimize cost for customer (8) and to provide on-site availability of Power to Grid on Demand (10).

As the NOC controls a large number of distributed equipment that can provide precise available power for the grid operation on demand, the NOC acts as virtual power plant whose power can be drawn on-demand over a selected period to avoid high costs and electricity losses of peaking plants while assisting in the relief of congestion interties of electricity transporting through the grid, for example.

Figure 2A:
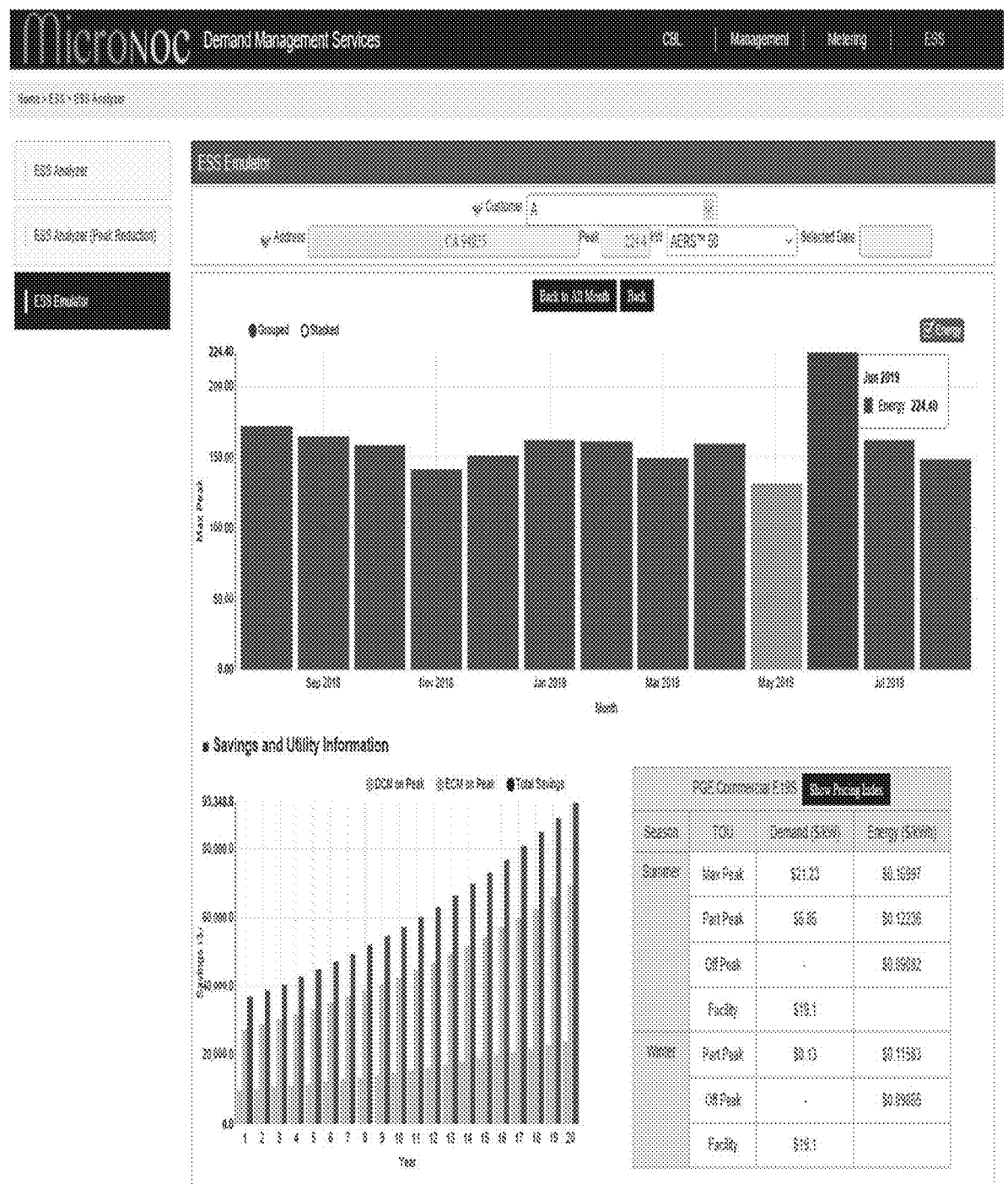
FIGS. 2A-2C illustrate an exemplary on-line user interface to illustrate electricity cost analysis and recommendations for a customer.
Figure 2B:
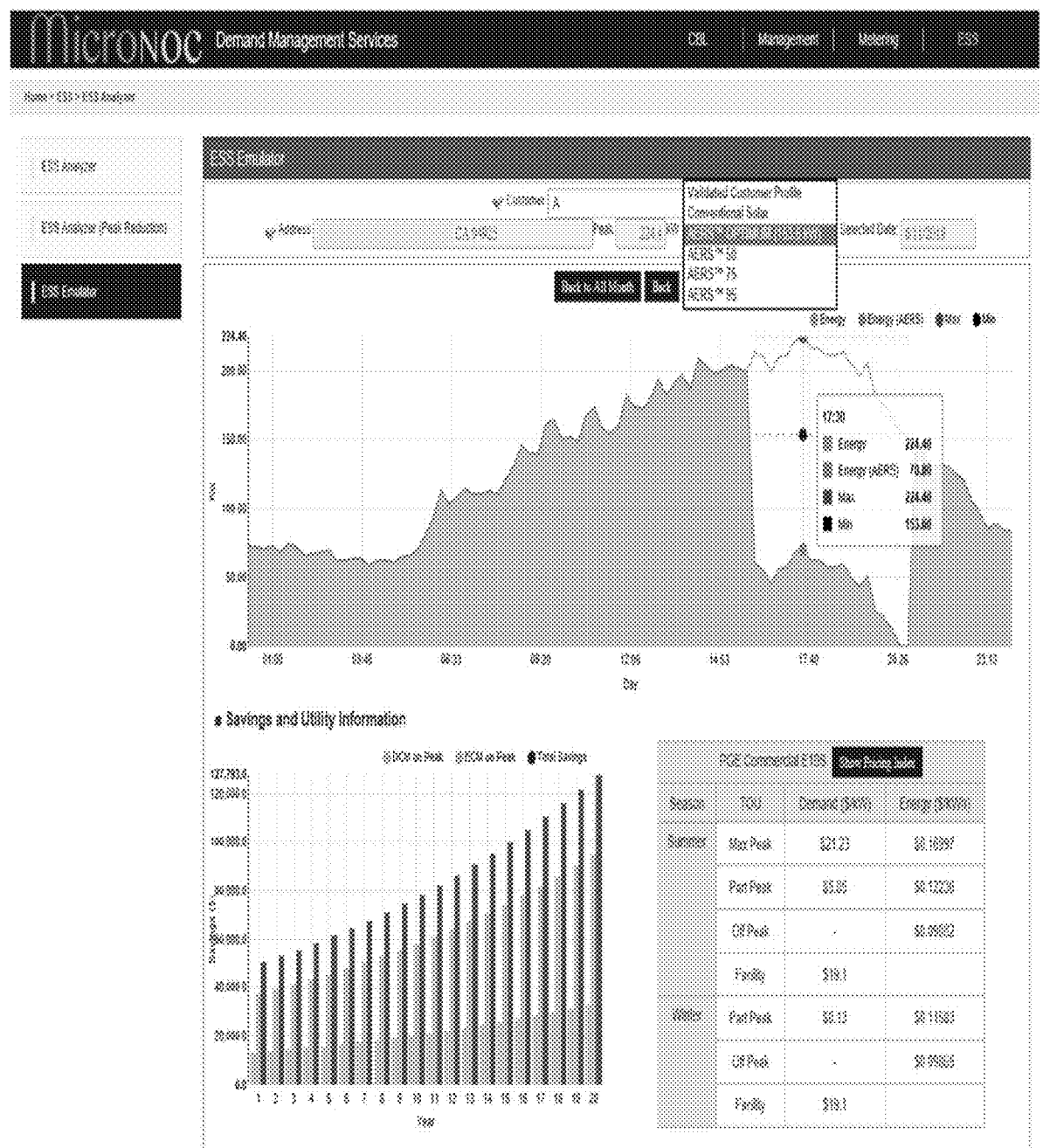
Figure 2C:
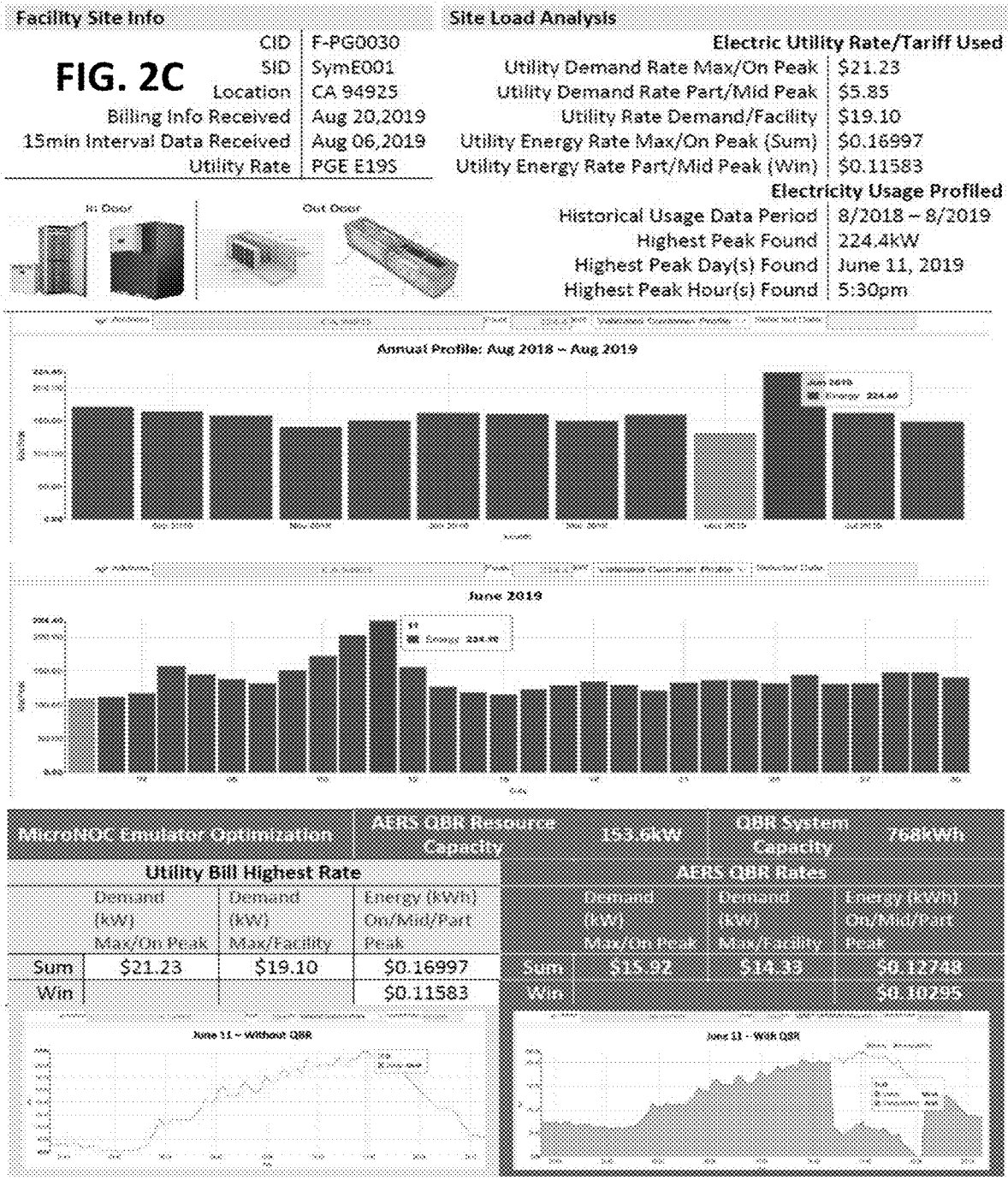

FIGS. 2A-2B illustrates an exemplary on-line user interface to illustrate electricity cost analysis and recommendations for a customer, while FIG. 2C illustrates an exemplary electricity costs analysis and what will be provided by the system for a customer site.

Turning now to FIGS. 2A-2C, the set of User Interfaces consists of,
a) Logging in with user name and Id.
b) Click on ESSEmulator.
c) Select customer's profile from the list.
d) Select from 'Validate Customers Profile (VCP)', ARES™ (50, 75, 95), Conventional Solar.
e) Click on customer load graph to view Monthly to Daily, Daily to 15 Min interval.
f) Click 'Back' button to view 15 Min interval to Daily, and Daily to Monthly.
g) Click 'Back to all' button to view 15 Min interval or Daily to Monthly Graph.

Customers who are registered with the system and connected with 15 min interval data such as Green Button to the system database will be profiled in the savings simulator. Utility Tariff Rate Schedule, energy consumption pattern will be displayed.

The system operator can select Customer from the list, and the site load data, and tariff rate schedule will be automatically displayed. Next, QBR Analysis software will be providing optimal input capacity by looking at the highest peak and lowest peak during the peak hours. The 95 percent of lowest peak, and 50% of the highest peak. Whichever has lower value will be the optimal input capacity. The software will display demand cut (50%, 75%, 95%) on the customers load graph during highest peak hours (4 pm to 9 pm). The optimized scenario adjusts system output so that the lowest power consumption is at zero. The savings caused by Energy Storage System will be generated and displayed. The software can display the highest peak date graph with 50%, 75%, 95%, and optimized graph of highest peak during peak hours. That will be used as system input capacity and will display demand cut by the input capacity during the highest peak (4 pm to 9 pm) and savings will be generated based on the amount cut and tariff schedule. A conventional Solar Analysis can also be done to show the difference between traditional solar on demand/usage at site versus AERS™ optimum with or without solar, where the software will display solar kWh cut on the customers load graph during sun hours (11 am to 5 pm). The solar input and output data are based on NREL PVwatt calculator where QBR analysis system connects directly with through API. A visual of traditional and optimum of solar kWh cut will be displayed on the customers load graph during the sun hours and highest peak expensive hours of grid. Using customer's address information, NREL API will provided the solar input and output data to generate the enhanced QBR ESS+ Solar system projection data.

As shown in FIGS. 2D-2E, QBR savings analysis report for ESS+Solar specializes in analyzing optimum system capacity based on load analysis of site for the purpose of reliability, congestion relief, cost reduction and deferral needs of grid operation rather than the traditional increasing of solar system capacity and alteration of utility rate tariff to accommodate grid balancing. Solar generation can then significantly be in a real-time controllable environment to be utilized at the proper times of load usage and grid needs with less costs for customers, utility and grid operators.

Figure 3A:
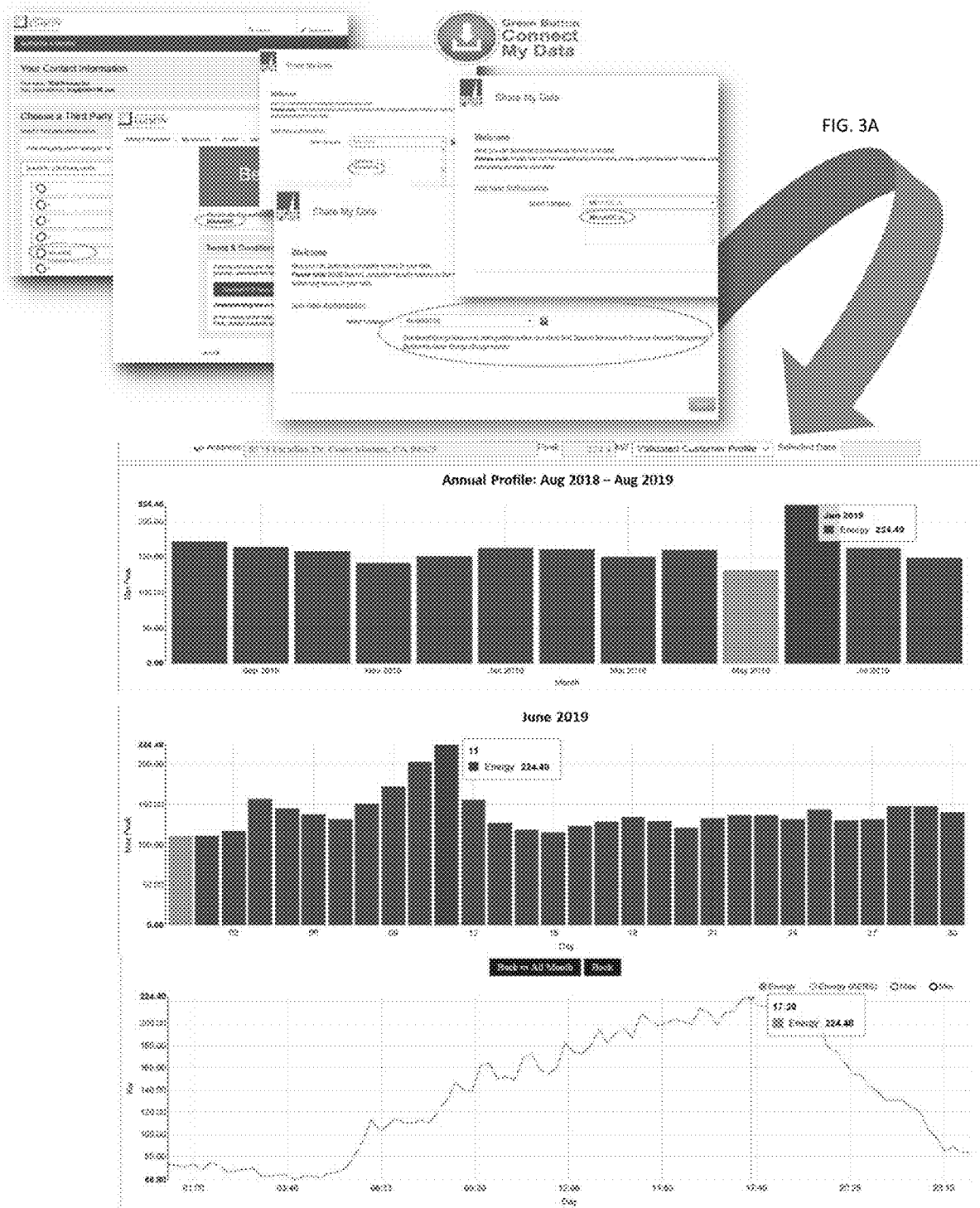

FIGS. 3A-3B shows in more details the profiling operation 2 of FIG. 1. Turning now to FIG. 3A, more details are provided for determining the client profile. First, the process obtains a Validated Customer/Clients Profile (VCP). The customer authorizes and provides 15 min interval data, and in one embodiment with PG&E as the utility, this is done via a Green Button connection ("Validation Process"). The most recent one-year data of the customer's consumption behavior is digitized by yearly/monthly/daily patterns to find the Demand Peak Patterns and the Patterns during ON PEAK hours under Utility Tariffs. Typically the utility and grid operators provides 2-3 times more demand capacity than actual usage of clients. This causes significant "waste" by oversupplying energy, transmission delivery capacity (T-Demand) and distribution delivery capacity (D-Demand). The system performs synchronizing of customer's pattern into Grid operation, which is the ultimate goal of "Balancing."

Turning now to FIG. 3B, the process of emulating and optimizing BTM Resources and Savings is detailed. An Emulator calculates and optimizes the capacity of BTM resources which can be integrated with Energy Storage System (ESS) and Solar photovoltaic (PV) cells. One implementation of the Emulator runs the following pseudocode:

Find the highest peak (kW) during ON PEAK hours (highest electricity price by congested pricing)
Find the lowest peak (kW) during ON PEAK hours
Calculate both monthly (seasonal effects are counted) and daily
Calculate 95% of lowest peak and compensate with highest peak with compensators of 50%, 75% and 95%, and optimized (or lowest consumption at zero)
As an example, a Client with 1,000 kW (highest peak) and 800 kW (lowest peak during ON PEAK hours)
Optimum ESS Capacity: 800 kW×95%=760 kW compensated with 76% of highest peak
Client's utility ON PEAK hours: 5 Hours
Total Storage Capacity=760 kW×5 hours=3,800 kWh
System Configuration of ESS: 760 kW (PCS)+3,800 kWh (Li-Battery)*—will be further adjusted by ex-factory hardware standard capacity ("name plate capacity")
Solar PV uses ONLY TO FEED BATTERY (i.e., NO A/C connection to Grid)
Customer's site sun radiation hours: 6 hours (example)
Maximum capacity of energy production from Solar: 3,800 kWh calculated by battery capacity
3,800 kWh×365 days/year=1,387,000 kWh/year
1,387,000 kWh to reverse calculated PV panel capacity from NREL (PV watts calculator): 1,387,000/6 hours/ 82% (NREL)/365 days=772kWdc of Solar PV required
*760 kW PCS+3,800 kWh Li-Battery+772kWdc Solar PV are optimized to realize THE MAXIMUM VALUE OF ENERGY to balance rate and balance grid FIG. 3C shows an exemplary cost saving projection. In one embodiment, QBR Integration CONTROLS ENERGY AND TIME. QBR delivers precise amount of energy at the best time which often occurs highest price due to congestion of demand. QBR Integration saves BOTH DEMAND CHARGE ($/kW) and ENERGY CHARGE ($/kWh). QBR can precisely reduce Demand Peak and shows approximately 3 time more savings than that of conventional solar saving projections AERS™ QBR system integration designs with existing infrastructure in mind to help utilities, state, and authorized local jurisdiction (ALJ) defer and/or reduce the cost of upgrades and improvements to accommodate societal changes such as population/development growth, climate, and/or increased electrical connecting device lifestyles by balancing the electricity usage demand synchronized with grid operation balancing 24/7/365.

Conventional solar system and its capacity is designed based on fix time (NREL sun hours) and financial attributes for the solar system energy generation itself such as utility solar tariffs which are normally capped for retail rates (non-export connection) or using variable hourly wholesale rates (export connection). In other words, the solar system is not controllable and/or synced with grid balancing operation. Therefore, when highest cost of on-peak hours changes with utility and grid balancing operation of physical electron supply and demand the solar power generation from the conventional system becomes part of the "wasted" power supply in the energy transportation chain and requires more expansive peaking power generation needed for grid stability. By using AERS™ Optimum QBR system configuration of ESS+Solar three things occur: 1) equipment costs of system integration reduces as solar becomes a DC coupled system directly into ESS power conversion system (PCS), therefore solar invertors are eliminated; 2) since solar is designed mainly for the purpose of assisting the energizing of ESS, system capacity of solar will never be more than ESS capacity and physical electrons does not directly connect to load usage directly; 3) controlled time operation of solar electron usage, which can be mostly dispatched accordingly on the hours of most needed times for both grid and usage demand, thus no alterations of utility tariff rate schedules is necessary and the dependency of sun hours can be irrelevant for grid operation.

Figure 4:
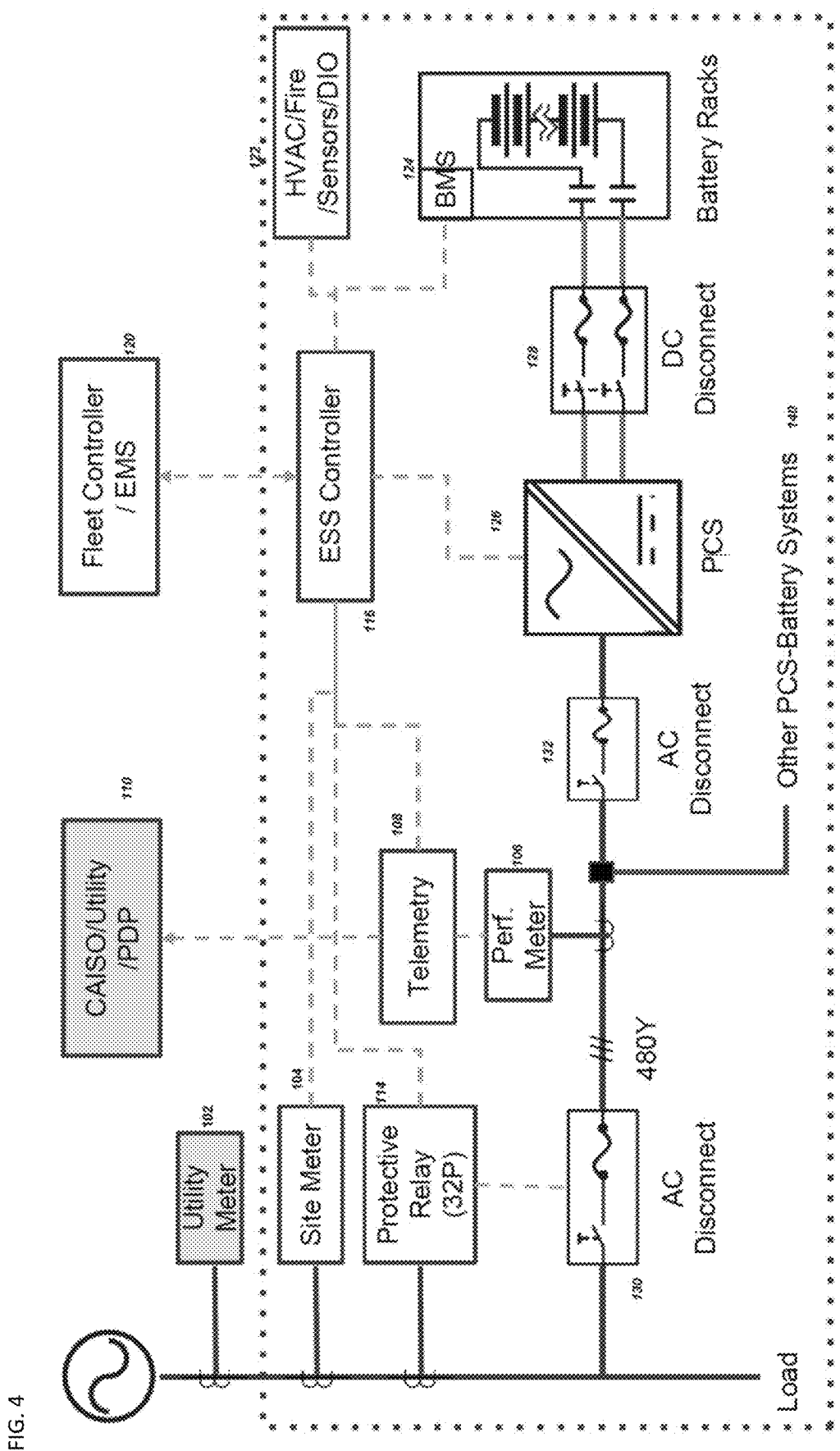
FIG. 4 shows an exemplary hardware formed using the capacity sizing solution in the process of FIG. 1.

FIG. 4 shows an exemplary system designed in FIG. 1. In this system, power is supplied by the grid and consumed by one or more loads. Such consumption is measured by a utility meter 102 and a site meter 104, and a performance meter 106. Data captured by meter 106 is provided to a telemetry unit 108 that provides to an ISO/utility authorized communication protocol 110. The output of telemetry unit 108, along with the site meter 104, is provided to an energy storage system (ESS) controller 116. The controller 116 also receives line quality data as captured through protective relays 114. The controller 116 also controls HVAC systems, fire alarms, alert signal systems, and/or suppression systems, sensors, and input/output devices 122. The controller 116 also controls a battery system 124 with a battery management system and a plurality of battery racks. The controller 116 can control the charging of the battery system 124 using a power conversion system 126, which has a DC disconnect 128 for safe disconnect from the battery system 124. Similarly, an AC disconnect 130 is positioned between grid power and a second AC disconnect 132 before power goes into the PCS 126. Additionally, other PCS systems or battery systems 140 can be connected to the output of the AC disconnect 130.

The ESS 116 selectively provides power in response to a customer power demand and energy usage behavior to prevent a customer grid power consumption from high spiking peaks during the grids most unstable or imbalanced high cost times. For the majority of AERS™ QBR operation, the customer's power consumption is well within the utility and grid operations baseload supply thus keeping the electric bill at the lowest cost possible. During the off-peak hours usually the baseload's low-cost rate period, the ESS is charged or energized from the grid power some or all of energy needed depending on QBR ESS or ESS+alternative power generation system installed on site. The increase of site loads off peak cost hours are minimal if any because discharging hours of QBR ESS for high cost on peak hours are mainly 6 hours or less accumulated in a 24 hours period and the lowest cost hours for charging can be spread through efficiently through a spread of the rest of 18 hours.

As the ESS 116 only kicks in on a minority of the time, the ESS 116 contains power that can be tapped into to correct grid disturbances. This ability is enhanced when aggregation of ESS 116 connected at C&I main electric switchgears that can be controlled by a network operations center (NOC) to collectively supply power into the grid by discharging for reduction of load from grid or by charging to increase load consumption when grid is over energized to address a power imbalance that can lead to brown-outs. When such collection of ESSes provide power to the grid, they can be compensated by the utility or ISO. The utility wins because it can avoid spending billions on a new powerplant, and the ESS/NOC wins with extra revenue from being a virtual power plant that can inject or reduce power for a selected period in response to a request from an ISO or a utility. Thus, the meters need to be ISO allowable and/or revenue grade meters.

In the system of FIG. 4, the utility meter and the ISO meter are revenue grade meters that conform to specifications by the utility and the ISO. Meter data represents the energy generated or consumed during a settlement interval. The ISO, ISO metered entities, and scheduling coordinator (SC) metered entities follow prescribed processes and procedures to ensure the data is settlement quality. The ISO meter performs accurate metering of electricity generated or consumed provides key data inputs for accurate settlement calculations. Direct measurement of a generator or load participant through telemetry allows the ISO or the utility to manage and monitor power generation in real-time. The specification of the meter is highly controlled, as the ISO and utility bill based on the meter output.

In one embodiment, CAISO Metered Entities ensure that the Meter Data obtained by the CAISO directly from their revenue quality meters is raw, unedited and un-aggregated Meter Data in kWh values. The CAISO or SC will be responsible for the Validation, Estimation, and Editing process of that Meter Data in order to produce Settlement Quality Meter Data.

The system of FIG. 4 conforms to utility and ISO specifications, as the ISO controls the local utilities to ensure orderly operation for electricity supply in a region. For example, the California Independent System Operator (CAISO) is a non-profit Independent System Operator (ISO) serving California and oversees the operation of California's bulk electric power system, transmission lines, and electricity market generated and transmitted by its member utilities. By providing a separate compliant meter for the ISO, the system can now participate direct to the ISO to help facilitate local utility's reliability and CAISO's grid balancing of energy supply and demand. Each QBR resource are registered with CAISO SC resource ID and AERS™ Point of Control/Trade (POC/POT) ID that are synchronized with utility rate tariff, system load meter data, and CAISO Lap Points and pNodes.

Figure 5:
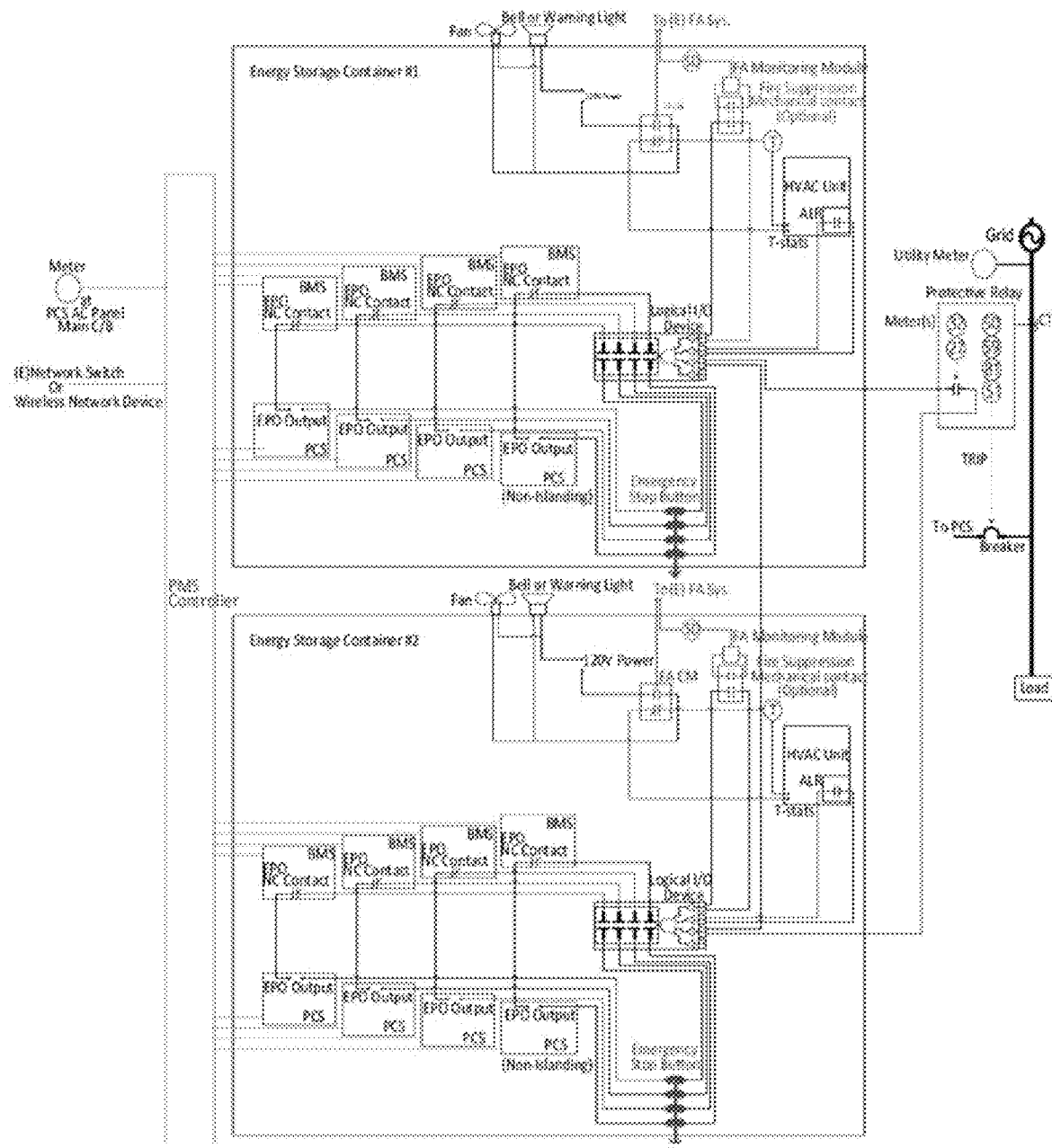
FIG. 5 shows in more details one implementation of FIG. 4.

FIG. 5 shows in more details one implementation of FIG. 4. In this embodiment, a meter and a NOC network controller are connected to a power management system (PMS). The PMS in turn is connected to each of the aggregated ESS management system that are connected a remote on site NOC controller. Each BMS/PCS combination is tied to manual stop button or disconnect switches and circuit breakers on site to ensure safety and security of onsite system. Also, to ensure proper metering telemetry and the safety of physical electricity connection, the QBR system it is protected using protective relays approved by utilities. In turn each of the QBR POC satisfies the minimum requirement of California Public Utilities Commission Electrical Interconnection Tariff Rule 21.

The charging and discharging scheduling method for ESS in FIG. 4-5 under time-of-use price applied in one embodiment, accesses the ESS as part of electricity grid device to safely and efficiently deliver electricity to and from buildings, that plays a role of load shifting, improves the safety and stability of the power and energy usage operation under time-of-use price, and meanwhile increases the efficiency of energy utilization and the economy of the transmission and distribution grid and load usage operation, that can truly make building-to-grid (B2G) feasible and controllable building demand into grid assets.

The charging and discharging scheduling method for the system of FIG. 4-5 under time-of-use price applied in one embodiment, incorporates not only the ESS, but also the photovoltaic unit, and other power sources such as gas generator, into the optimal scheduling model of B2G, which consummates the optimal scheduling model considering only the ESS.

Figure 6:
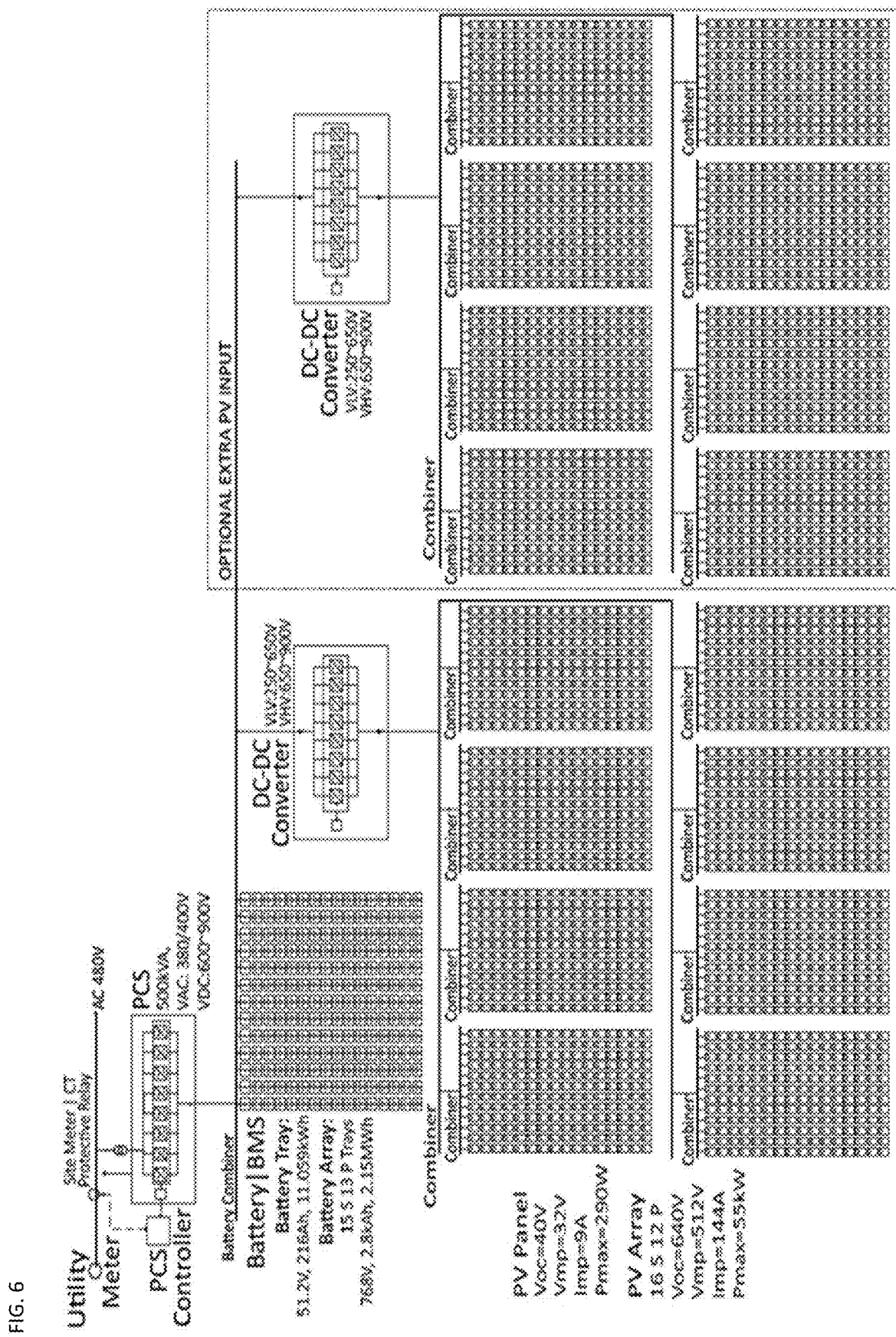
FIG. 6 shows an optional PV module that is connected to the ESS of FIG. 4.

FIG. 6 shows an optional PV module that is connected to the ESS of FIG. 4. In this embodiment, the PV module provides power to the ESS that is then smoothed and used and/or stored by. As power is needed through the balancing of the grid operation chain, building's load usage can then provide and facilitate through the control of QBR systems. In another perspective the building's switchgear is upgraded to become a smart switch by adding on QBR attributes as a behind-the-meter resource for utilities and grid operators without the actual upgrade costs and time constraints. In this embodiment, a combiner collects outputs from the PV arrays, and the collective PV outputs are provided directly to a DC to DC coupled PCS connected to storage unit. When needed, the ESS drives an inverter to generate AC outputs, thus eliminates electricity loss or waste of generation. One embodiment runs the following determinations:

a. winter_energy_arbitrage=winter_partpeak_energy−winter_offpeak_energy b. summer_energy_arbitrage=summer_maxpeak_energy−summer_partpeak_energy c. arbitrage_avg_rate=(winter_energy_arbitrage*8+summer_energy_arbitrage*4)/12 d. energy_avg_rate=(winter_partpeak_energy*8+summer_maxpeak_energy*4)/12 e. Solar_saving_DC_yr1=Summer_Maxpeak_demand*Input_capacity*4 f. ECM_Saving_yr(n)=energy_avg_rate*Input_capacity*5*365*(1.05)n−1 g. Total_saving_yr(n)=Solar_saving_DC_yr(n)+ECM_Saving_yr(n)

h. WO_soalr_Total_yr(n)=Solar_saving_DC_yr(n)+WO_solar_ECM_yr(n)

i. HoursFilterData={A⊆Data: Data is in between 4 pm to 9 pm} j. AERS i. AERS_power_base=min(HoursFilter(daily_max)*0.5, HoursFilter(daily_min)*0.95)

ii. AERS_50=AERS_power_base*0.5 iii. AERS_75=AERS_power_base*0.75 iv. AERS_90=AERS_power_base*0.95 v. AERS_OPTIMUM=For all energy usage between 4 pm to 9 pm, subtract daily_min k. Conventional Solar .PvWATT is an API call accepts parameters including input capacity, address, and so on.

i.sunhours=PvWATT(input, address)/input/30

In this embodiment, the customer's consumption history data is automatically download from Utility Servers, called "GREEN BUTTON." An emulator calculates and computes lowest peak data during TOU-ON PEAK with highest peak one per yearly, monthly and daily out of the customer's history data. The emulator computes OPTIMUM capacity of resources, such as Energy Storage System, Solar PV and Gas Generator, in order to maximize economy value of the resources. The OPTIMUM CAPACITY value generates economy projections over 20-project years. VCP is a requirement in order to apply for California SGIP incentives program. Based on VCP, the system provides the fully TOU synchronized system design, called Qualified Balance Resources (QBR). QBR provides Definitive Capacity of Resources made by one or multiple integrations from Energy Storage System, Solar PV and Gas Generator as well as Grid power. The capacity from each resource shall be computed and synchronized by TOU patterns of the users and GRID.

Figure 7:
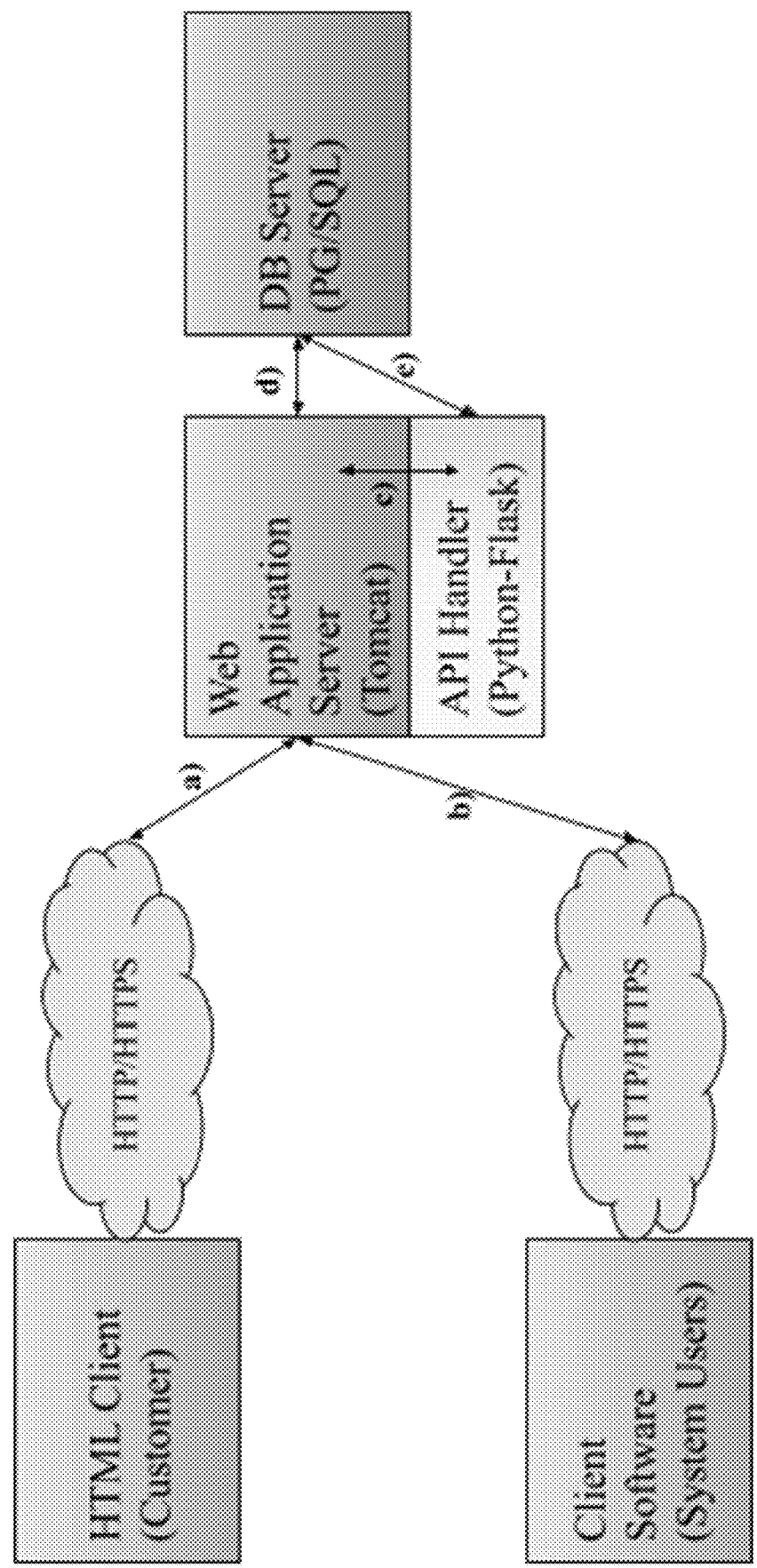
FIG. 7 shows an exemplary cloud based energy management system.

FIG. 7 shows an exemplary web architecture for the cloud based energy management system. The system includes web/html clients that communicate over http channels to an application server with an Application Program Interface (API). The server and API handler communicates with a database server that responds with data upon request.

The AERS technology is applied with an energy management system (EMS) to operate energy storage resources from Behind-the-Retail Meter. The EMS system exists at each end, which plays the role of organically controlling and monitoring terminals such as relays, meters, BMS, and PCS. In the past, devices similar to EMS existed, but it was composed of a traditional server-client structure, having potential problems. The server-many client model has the following problems. First, the state of the server affects the entire system. Since the server has to handle real-time responses from multiple clients, the load is always high, and the server system down due to this high load is fatal to the system's reliability. Second, it is about the scalability of the server. The traditional server-client architecture makes it difficult to expand the server to support more clients. Third, servers are always vulnerable to hacking, such as attacks from hackers and malware attacks. Due to the above problems, it is not easy or impossible to implement a safe, reliable, and available system through traditional methods. An EMS trace subsystem with transceivers communicate with the EMS global data space to provide run-time verification.

Figure 8:
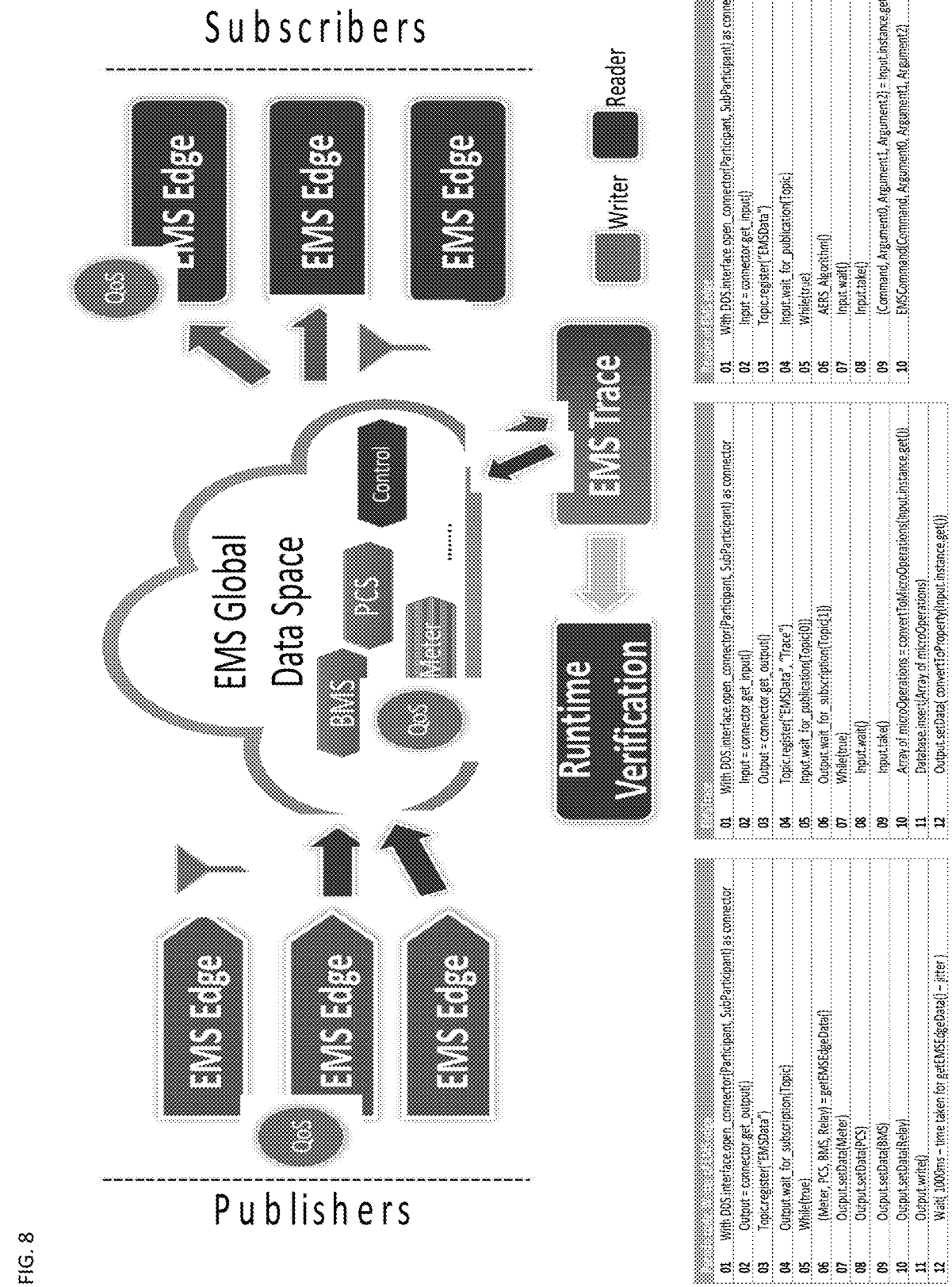
FIG. 8 shows an exemplary Data Distribution Service (DDS) system.

To address the above issues, FIG. 8 shows an exemplary Data Distribution Service (DDS) system. AERS embraces a distributed network's advantages, providing a global data space, quality of service (QoS), filtering, dynamic discovery, scalable architecture, and enhanced security as shown in FIG. 8. In this embodiment, a plurality of EMS edge publishers (or writers), each conforming to QoS requirements, communicate wirelessly over a cloud to an EMS global data space that includes BMS, Meter, PCS, and control software. A plurality of EMS edge subscriber devices (or readers) receive data from the EMS global data space.

The DDS is a state-of-the-art methodology/technology in which each node can exist independently and, at the same time, perform information exchanges. Also, AERS has an additional layer that guarantees traceability and a response within 1000 ms, making it possible to ensure real-time, which is significant in the energy market. Through this, EMS devices of AERS, which are distributed everywhere, search/build networks with each other, and in the event of a failure, they can perform safe data exchange without affecting other EMSs.

The energy market is changing from a large power plant to numerous small virtual power plants. These changes are challenging to cope with traditional system architecture/techniques, and AERS proposes a real-time, traceable system based on DDS.

Figure 9:
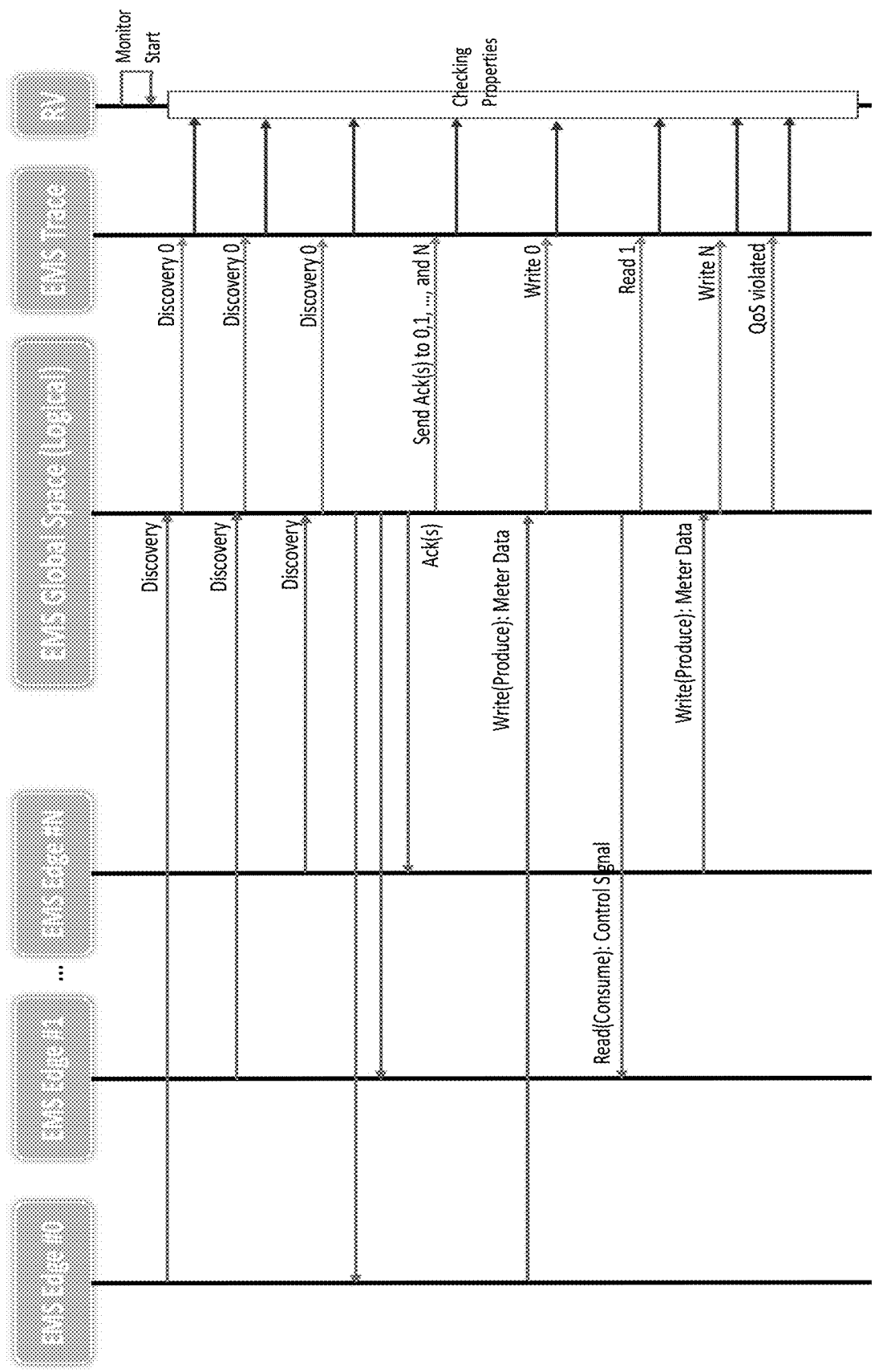
FIG. 9 shows an exemplary scenario with a DDS-based EMS.

FIG. 9 shows an exemplary scenario with a DDS-based EMS. FIG. 9 shows a sequence diagram showing a scenario in which a DDS-based EMS works. The EMS Global Space is not a physical but logical domain in this embodiment, having a distributed network. Each EMS Edge first looks for the DDS-EMS network. Each node receives an acknowledgment (ACK) and receives a signal that it has successfully connected. EMS Trace records all actions that occur (black box), which is passed on to the Runtime Verification (RV) unit. Each edge performs read/write according to the QoS, and when it violates the 1000 ms operation time limit, which is global QoS, it also informs the trace. EMS Trace converts the recognized signal into a well-defined property and delivers it to the RV, and the RV performs runtime monitoring based on Linear Temporal Logic (LTL). This RV is an in-situ middleware that always checks/monitors the overall safety of the system. Pseudo-codes for the modules in FIG. 9 include:

Writer of EMS edge Module or Node
01 With DDS.interface.open connector(Participant, Sub-Participant) as connector
02 Output=connector.get_output( )
03 Topic.register("EMSData")
04 Output.wait_for_subscription(Topic)
05 While(true)
06 (Meter, PCS, BMS, Relay)=getEMSEdgeData( )
07 Output.setData(Meter)
08 Output.setData(PCS)
09 Output.setData(BMS)
10 Output.setData(Relay)
11 Output.write( )
12 Wait(1000 ms−time taken for getEMSEdgeData( )−jitter)

Pseudo code: EMSTrace Module or Node
01 With DDS.interface.open connector(Participant, Sub-Participant) as connector
02 Input=connector.get_input( )
03 Output=connector.get_output( )
04 Topic.register("EMSData", "Trace")
05 Input.wait_for_publication(Topic[0])
06 Output.wait_for_subscription(Topic[1])
07 While(true)
08 Input.wait( )
09 Input.take( )
10 Array of microOperations=convertToMicroOperations(Input.instance.get( ))
11 Database.insert(Array of microOperations)
12 Output.setData(convertToProperty(Input.instance.get( ))

Pseudo code: Reader of EMS edge Module or Node
01 With DDS.interface.open_connector(Participant, Sub-Participant) as connector
02 Input=connector.get_input( )
03 Topic.register("EMSData")
04 Input.wait_for_publication(Topic)
05 While(true)

```
06 AERS_Algorithm( )
07 Input.wait( )
08 Input.take( )
09 (Command, Argument0, Argument1, Argument2)=Input.instance.get( )
10 EMSCommand(Command, Argument0, Argument1, Argument2)
```

In some embodiments, the above systems may be implemented as a cloud-based computing environment, such as a virtual machine operating within a computing cloud. In other embodiments, the computer system may itself include a cloud-based computing environment, where the functionalities of the computer system are executed in a distributed fashion. Thus, the computer system, when configured as a computing cloud, may include pluralities of computing devices in various forms, as will be described in greater detail below. In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources. The cloud may be formed, for example, by a network of web servers that comprise a plurality of computing devices, such as the computer system, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

What is claimed is:

1. A system to manage power consumption from a grid, comprising:
    a building switchgear;
    an energy storage system (ESS) coupled to the building switchgear to selectively provide power in response to a customer power demand to prevent a customer grid power consumption from spiking and peaking at grid imbalance highest cost on peak times;
    an energy management system (EMS) to operate the ESS from behind-the-meter; and
    a data distribution service (DDS) coupled to the EMS forming a DDS-EMS network to provide a global data space servicing EMS edge publishers and subscribers, wherein the EMS edge publishers and subscribers looks for the DDS-EMS network and wherein each EMS edge node receives an acknowledgment and a signal on DDS-EMS network connection, wherein a trace module records and passes actions that occur to a Runtime Verification (RV) unit.

2. The system of claim 1, comprising a trace layer that guarantees traceability and a response within a predetermined period.

3. The system of claim 1, wherein the RV performs runtime monitoring based on Linear Temporal Logic (LTL).

4. The system of claim 1, wherein each edge publisher or subscriber performs read/write according to a quality of service (QoS) and wherein the QoS is communicated over a trace layer.

5. The system of claim 4, wherein QoS comprises a predetermined operation time limit.

6. The system of claim 4, wherein QoS comprises a 1000 ms operation time limit and the QoS is communicated to a trace module.

7. The system, of claim 1, comprising an independent system operator (ISO) accepted meter coupled to the building switchgear, the ISO meter including a telemetry unit to communicate with an ISO.

8. The system of claim 1, comprising a utility revenue grade meter coupled to the building switchgear.

9. The system of claim 1, comprising an ESS controller to control operations of the ESS including a battery management system in each battery rack and a power conversion system (PCS) coupled to the battery rack, and a battery fire alarm system or fire suppression system.

10. The system of claim 1, comprising AC and DC disconnect switches positioned between the grid and one or more power conversion systems.

11. The system of claim 1, comprising code to profile Customer Electricity Usage, code to determine electricity cost savings, and code to optimize resource capacity.

12. The system of claim 1, comprising code to determine a consumption behavior over a period of time to identify a Demand and Energy Peak Usage Pattern and Patterns during on-peak hours under Utility Tariffs.

13. The system of claim 1, comprising code to find a highest peak (kW) during on-peak hours and code to find a lowest peak (kW) during on-peak hours.

14. The system of claim 1, comprising code to calculate 95% of lowest peak and compensate with highest peak.

15. A system to manage power consumption from a grid, comprising:
 a building switchgear;
 an independent system operator (ISO) accepted meter coupled to the building switchgear, the ISO meter including a telemetry unit to communicate with an ISO; and
 an energy storage system (ESS) coupled to the building switchgear, and an ISO or System Performance Meter, wherein the ESS selectively provides power in response to a customer power demand to prevent a customer grid power consumption from spiking and peaking at grid imbalance highest cost on peak times; and
 a data distribution service (DDS) coupled to the EMS forming a DDS-EMS network to provide a global data space servicing EMS edge publishers and subscribers, the DDS including a trace layer that guarantees traceability and a response within a predetermined period, wherein the EMS edge publishers and subscribers looks for the DDS-EMS network and wherein each EMS edge node receives an acknowledgment and a signal on DDS-EMS network connection, wherein a trace module records and passes actions that occur to a Runtime Verification (RV) unit.

16. The system of claim 15, comprising a plurality of photovoltaic (PV) modules coupled to the ESS.

17. The system of claim 16, wherein the plurality of PV modules are connected to one or more PV combiners.

18. The system of claim 17, comprising a DC-DC converter coupled to the PV combiners, further comprising a plurality of battery combiners coupled to the DC-DC converter.

* * * * *